United States Patent Office 3,592,599
Patented July 13, 1971

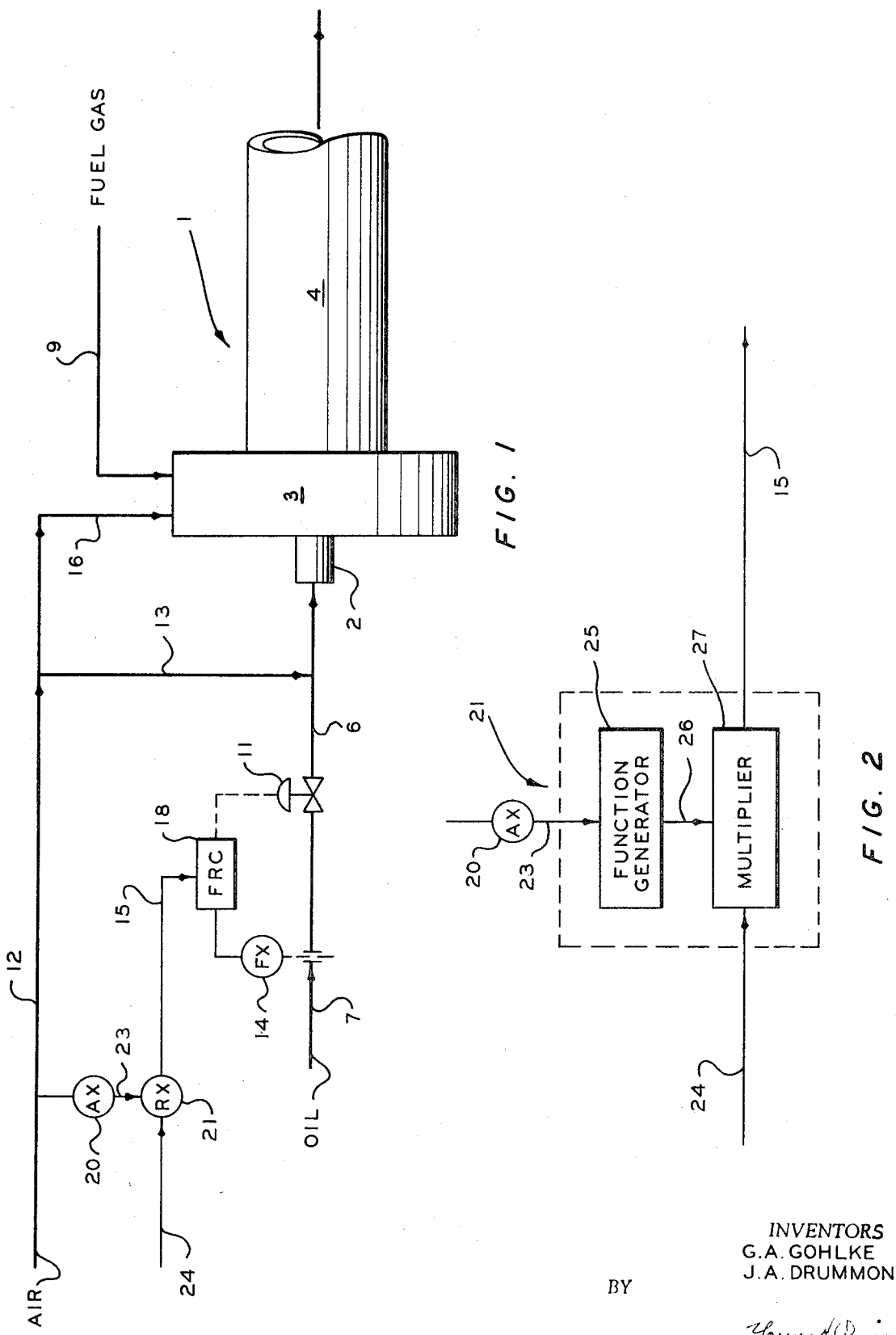

3,592,599
QUALITY CONTROL CARBON BLACK
PRODUCTION
Gerhard A. Gohlke and John A. Drummond, Borger,
Tex., assignors to Phillips Petroleum Company
Filed Aug. 26, 1968, Ser. No. 755,115
Int. Cl. C09c 1/50
U.S. Cl. 23—209.4          2 Claims

ABSTRACT OF THE DISCLOSURE

A method for controlling the quality of carbon black produced from the pyrolytic decomposition of a hydrocarbon feed which comprises adjusting the hydrocarbon feed rate to the reactor in response to variations in the water content of the reactant streams, particularly the oxygen-containing gas, fed to the reactor.

---

This invention relates to carbon black production.

In one of its more specific aspects, this invention relates to controlling the pyrolytic decomposition of a hydrocarbon to produce carbon black.

Carbon black is produced by the pyrolytic decomposition of a hydrocarbon. In the process, hydrocarbon and free oxygen-containing gas, usually, air, are introduced into a reactor to form a reactant mass, the hydrocarbon undergoing pyrolytic decomposition to form carbon black.

According to the process of this invention, there is provided a method for controlling the quality of carbon black produced from the pyrolytic decomposition of a hydrocarbon which comprises controlling the hydrocarbon feed, or make-oil, rate to the reactor in response to the water content of the reactant streams so as to minimize the effect of variation in the water content on carbon black quality.

In the preferred embodiment of this invention, there is provided a method of controlling the properties of the carbon black produced which comprises sensing the moisture content of the free oxygen-containing gas added to the reaction zone, and adjusting the make-oil rate responsive thereto to produce a carbon black of substantially constant quality.

Accordingly, it is an object of this invention to provide an improved carbon black process.

It is also an object of this invention to provide a method of producing a carbon black of more predictable properties.

The process of this invention is generally applicable to all conventional carbon black processes employing conventional reactants. It is similarly applicable to all commercial type reactors of any number of reaction zones and of any configuration.

Of the oxidizing agents introduced into the carbon black reactor to facilitate the pyrolytic decomposition of the hydrocarbon, ambient air is the most frequently used. This air will vary in water content with the prevailing atmospheric conditions. Generally, this air will vary in respect to its relative humidity from about 10% to about 100%, that is, from a moisture content in the air from about 0.1% to about 4.0% by weight at saturation. It would be expected that this water content would have little or no detectable effect on the process, particularly when this water content represents such a minute percentage of the total reactor charge.

It has now been discovered, however, that variations in water quantities, as caused by ordinary variations in atmospheric humidity, have an appreciable effect upon product quality of the carbon black. It has further been discovered that carbon black quality, particularly as represented by the surface area of the carbon black, can be controlled by compensating for amount of moisture introduced into the reactor. Further, there has been discovered a unique method of compensating for the moisture introduced into the reactor and of minimizing variations in product quality.

As previously mentioned, the principal reactor feed stream with which the moisture is introduced into the reactor is the ambient air. Accordingly, the invention as herein explained will be discussed in such terms although the moisture content of any of the streams entering the reactor can be similarly measured and comparable controls interrelated therewith as discussed hereinafter. Also, it is within the scope of this invention to determine the total moisture introduced into the reactor by any or by all of the individual streams and to control the process in a manner similar to that employed herein to stabilize product quality.

The process of this invention will be more easily understood when explained in conjunction with the attached FIGS. 1 and 2. In FIG. 1, there is shown in general outline a carbon black reactor 1 composed of a plurality of axially contiguous reaction zones including the feed introduction zone 2, the combustion zone 3, and that zone 4 in which a principal portion of the carbon black is considered as being formed and from which the carbon black product is removed from the reactor.

The various reactants, generally hydrocarbon make-oil, fuel and air, may be introduced into the reactor into feed introduction zone 2 or into combustion zone 3, or into both zones simultaneously and in any conventional proportions.

The make-oil conduit 6 provides make-oil to zone 2 as a continuation of conduit 7. Total fuel gas conduit 9 provides fuel to zone 3. Total air conduit 12 provides the air to zone 2 through conduit 13 and to zone 3 through conduit 16. It is understood that the points of introduction of these materials into the various zones, as illustrated, is schematic and some portion of each of the materials mentioned can be introduced, optionally, into each of the zones.

Conventional control systems compensate for temperature and pressure variations at the orifice. When metering air, the oxygen concentration therein is assumed to hold constant. Actually, the oxygen concentration may vary considerably, not only due to variations of the actual oxygen content of the air as caused by extraneous contamination but also due to atmospheric humidity. For example, normal atmospheric humidity variations can change the oxygen content of the air by up to as much as ten percent. To avoid such variations, there is incorporated into the air introductory system an automatic oxygen compensator.

Accordingly, the control system incorporated herein is a predictive, or feed-forward system, in which the rate of flow of the make-oil feed to the carbon black reactor is adjusted in predetermined relationship with the moisture concentration of the air, whatever that source of moisture, to effect regulation of the product carbon black properties to desired values.

Referring again to FIG. 1, the rate of oil flow to reactor 1 through conduit 7 is regulated by valve 11 which is operated by flow controller 18 responsive to a comparison of the measured rate of oil flow, as determined by linear flow transmitter 14, with the desired rate of oil flow, as provided through signal line 15.

The predictive manipulation of the oil feed rate to effect variations thereof with changes in water concentration in the air supplied through conduit 12 is accomplished by interrelating moisture concentration and oil rate to yield a predetermined product quality.

The concentration of the moisture in the air is measured by analyzer-transmitter 20, and a signal representative thereof is supplied to mathematical combining unit 21.

The mathematical combination unit 21 may be a simple multiplying device or an adding relay coupled with a multiplying device, or a computing assemblage such as a pneumatic or electronic analog computer. Within unit 21, the signal supplied by line 23, representative of the moisture content of the air, is combined with that signal supplied by line 24, the latter representing a nominal oil flow rate set point, or a manually adjustable bias value. Accordingly, the carbon black production rate is altered by adjusting the oil rate to produce constant quality carbon black in spite of changes in the moisture content of the air.

In the preferred embodiment, analyzer transmitter 20 produces a pneumatic output signal linearly related to the measured water concentration of the air passing through conduit 12. This signal is received by unit 21, which, as shown in FIG. 2, is composed of a function generator 25 connected by signal line 26 to multiplier 27.

The signal received by unit 21 is passed to function generator 25 wherein the oil rate, dependent upon the moisture content of the air, is determined as a function of that moisture content by means of a simple mathematical relationship. This relationship correlates a property of the carbon black, as affected by the moisture content of the air, with the necessary change in oil rate to maintain that property of the product black at a specific value, in spite of changes in the moisture content of the air. A signal, representative of the mathematical value so computed, and proportional to the change in oil rate is transmitted through conduit 26 to multiplier 27. After multiplication by signal 24 within multiplier 27, a signal is transmitted to flow recorder controller 18 by line 15, which signal adjusts the oil rate as necessary to compensate for the moisture content of the air. Flow recorder controller 18 then adjusts valve 11 to produce the compensated oil flow rate to reactor 1 and under these revised conditions of oil charge rate, the quality of the carbon black is maintained constant.

Equipment suitable for the above functions is commercially available.

Digital computing equipment may also be employed to perform the various functions required of the control system. It is only necessary that mathematical compatibility and consistency be provided in the sequence of steps required for the proper functioning of the apparatus.

As previously mentioned, the moisture content of any of the streams entering the reactor can be measured and adjustments of the oil rate can be made to maintain the quality of the carbon black constant. For each reactant stream, mathematical relationships can be individually established in respect to the effect of the water concentration therein on the carbon black properties. It is to be appreciated, however, that variation of the water content of the various streams may affect various properties of the carbon black.

Table I below, presents a run made under the method of this invention. Two other runs are also presented.

TABLE I

| Run No. | I | II | III |
|---|---|---|---|
| Make-oil: Rate, g.p.h | 255 | 244 | 255 |
| Quantities, M s.c.f./h.: | | | |
| Air to combustion zone (dry) | 233.1 | 227.4 | 233.5 |
| Moisture in air | 1.1 | 6.8 | 7.0 |
| Air to feed introduction zone (wet) | 4.0 | 4.0 | 4.0 |
| Vol. percent water in air | 0.5 | 2.9 | 2.9 |
| Carbon black properties: | | | |
| Photelometer | 95 | 95 | 98 |
| Surface area, m.²/gm | 123 | 123 | 117 |
| Structure, DBP, cc./100 gm | 110 | 109 | 105 |

Run No. I represents operations under certain conditions, including 1.1M s.c.f./h. moisture in the air to produce a carbon black having a surface area of 123 m.²/gm. at a photelometer of 95.

Run No. II represents operations in which the moisture content in the air to the reactor had increased to 6.8M s.c.f./h. According to the method of this invention, the make-oil rate was reduced responsive to the increased moisture content of the air. The reactor was operated to produce a carbon black of the same photelometer as that produced in Run No. I, and carbon black quality in respect to surface area, and structure, were maintained at the desired values.

Run No. III is comparable to Run No. I, but in this instance, no adjustment in make-oil rate was made for the increase in moisture content of the air. Accordingly, the quality of the carbon black, as represented by surface area, did not remain constant.

These data indicate that the method of this invention is effective in maintaining carbon black quality. It is only necessary to establish for any hydrocarbon charge stock a graphical representation between the hydrocarbon feed rate vs. the volume percent water in the air to the reactor when producing a particular surface area carbon black. Then, having determined or measured the water content of the air, it is a simple matter from this predetermined graphical relationship to adjust the hydrocarbon feed rate along the curve of constant surface area, either upwardly or downwardly, to maintain the so-produced carbon black production at a constant surface area value.

For example, based upon the data of Table I, it will be seen that if carbon black production is being conducted at a hydrocarbon feed rate of 255 g.p.h., with air being introduced in a total amount of 237.1M s.c.f./h., the air containing 0.5 volume percent water (Run I), and if the water content of the air is increased to 2.9 volume percent, then the product carbon black quality can be maintained at substantially constant quality by reducing the feed rate to 244 g.p.h. (Run II).

The above discussion has been limited, for purposes of explanation, to varying the make-oil rate with the water content of the air. However, variations in make-oil rate may also be correlated with the water content of any of the other reactant streams. However, such correlations may involve different mathematical relationships upon which to base the production, or feed-forward system employed herein.

While the invention has been defined in terms of specific measurements, instrumentation, and controls, it will be evident that these suggest other methods of accomplishing the same results. Hence, such modifications as are reasonably suggested by the foregoing are also to be considered within the scope of this invention.

What is claimed is:

1. In the process for the production of carbon black by the pyrolytic decomposition of a hydrocarbon feed by bringing said hydrocarbon feed to its carbon black-forming temperature by contacting said hydrocarbon feed with hot combustion gases produced by the oxidation of a fuel with water-containing, free oxygen-containing gas, said free oxygen-containing gas being subject to changes in said water content, the improvement comprising:
- (a) measuring the water content of said free oxygen-containing gas; and,
- (b) adjusting the rate of introduction of said hydrocarbon feed responsive to said measurement to produce carbon black having a substantially constant surface area.

2. The process of claim 1 in which said free oxygen-containing gas is air.

References Cited
UNITED STATES PATENTS

| | | | |
|---|---|---|---|
| 3,005,688 | 10/1961 | Williams | 23—259.5 |
| 3,350,173 | 10/1967 | Colby et al. | 23—209.4 |
| 3,390,960 | 7/1968 | Forseth | 23—209.4 |

EDWARD J. MEROS, Primary Examiner

U.S. Cl. X.R.

23—230, 232, 209.6, 259.5